UNITED STATES PATENT OFFICE.

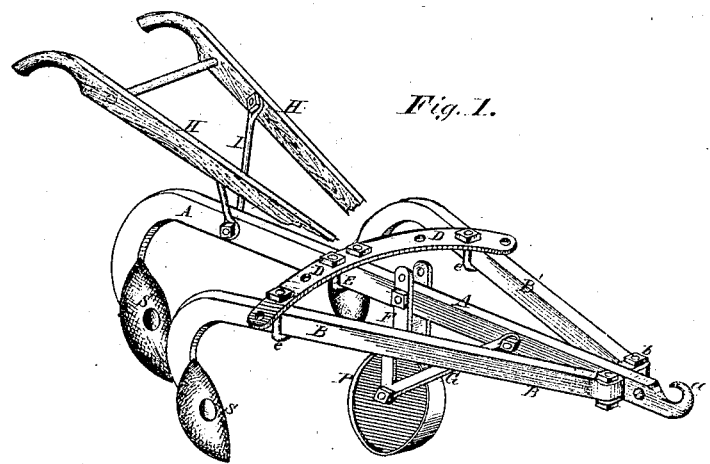
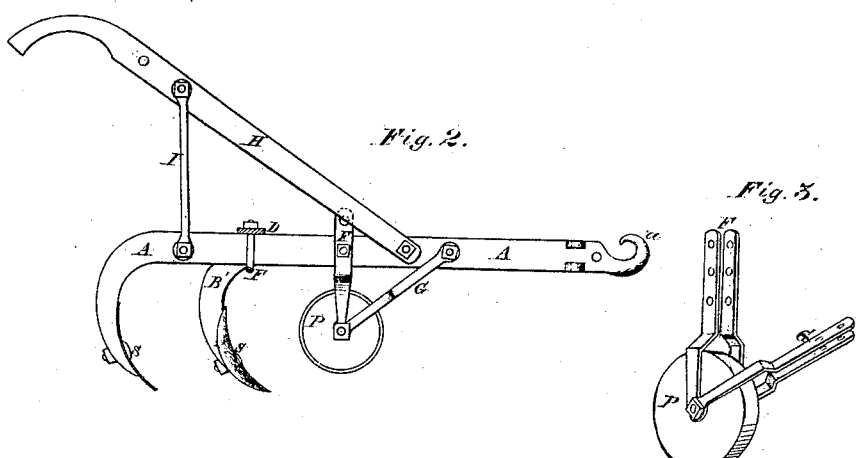
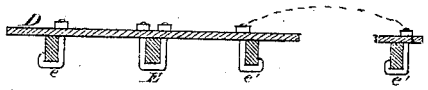

JOHN REBMAN, OF BINKLEY'S BRIDGE, PENNSYLVANIA.

IMPROVEMENT IN CULTIVATORS.

Specification forming part of Letters Patent No. 109,247, dated November 15, 1870.

*To all whom it may concern:*

Be it known that I, JOHN REBMAN, of Binkley's Bridge, in the county of Lancaster and State of Pennsylvania, have invented Improvements on a certain class of Cultivators, of which the following is a specification.

It is desirable, frequently, to change the position of the supporting wheel or pulley under certain conditions of the soil, and to have it made so that it can be adjusted to govern the dip of the shovels.

The nature of my improvement on the wrought-iron three-pronged adjustable small-shovel cultivators so much in use consists, simply, in the changeable and adjustable pulley and mode of securing the curved top plate to the respective shovel-arms.

The accompanying drawings show this kind of a cultivator with my improvements in place.

Figure 1 is a perspective view of the shovel, harrow, and position of the pulley; Fig. 2, a side elevation; Fig. 3, the pulley and its supports detached. Fig. 4 shows the clip or hook screw-bolts for securing the curved crossbars when adjusted to the shovel-arms.

In this kind of cultivators, (having purchased the right of Michstoll's patent, No. 82,043, September 8, 1868,) which, like all the others I know of, have the pulley placed in front and not made reversible and adjustable, I affix the pulley P to the central bar or shovel-arm, A, by means of a headed screw-bolt and nut. The vertical bearings F of the pulley are pierced for adjusting the pulley higher or lower, to regulate its bearing upon the soil, accordingly as the same is hard or mellow. The brace-arms G give an additional support by thus placing the pulley behind the attachment of the handles.

A peculiar advantage is given by forming a central fulcrum for controlling the action of the cultivator by the handles H, so as to have much greater command to adapt its general action to the draft of the horse and rise and fall of the ground, which is not attained when the pulley is placed in front, as is the universal custom in this kind of cultivators.

I also find that the U-clip E, for holding the central bar, with the screw ends and nuts, to the curved adjusting-bar D, as well as the reversible end or side hook-bolts, $e$ $e'$, for making the adjustments, are superior and an improvement upon the kinds heretofore in use; otherwise I claim no novelty. Pulleys are common. The adjustable side arms and shovels are not new. But, while the changes made seem to be simple, practically they result in producing a marked superiority, and farmers give this arrangement a decided preference.

What I claim as my invention, and desire to secure by Letters Patent, is—

The arrangement, in a cultivator, of a fulcrum-pulley, P, adjustable bearings F, adjustable brace G, central shovel-arm, A, curved bar D, clip E, and hook-bolts $e$ $e'$, all constructed to operate as described.

JOHN REBMAN.

Witnesses:
WM. B. WILEY,
JACOB STAUFFER.